United States Patent
Kim et al.

[11] Patent Number: 6,055,352
[45] Date of Patent: Apr. 25, 2000

[54] OPTICAL WAVELENGTH OPTIMIZATION FOR HIGH SPEED WDM TRANSMISSION SYSTEM

[75] Inventors: Inho Kim, Lower Macungie Township, Lehigh County; Thomas James Miller, Fleetwood, both of Pa.

[73] Assignee: Lucent Technologies, Murray Hill, N.J.

[21] Appl. No.: 08/920,987

[22] Filed: Aug. 29, 1997

[51] Int. Cl.[7] .................................................. G02B 6/26
[52] U.S. Cl. .............................................. 385/123; 385/15
[58] Field of Search .............................. 385/24, 123, 88, 385/15, 161, 153, 195

[56] References Cited

U.S. PATENT DOCUMENTS

| | | | |
|---|---|---|---|
| 5,361,319 | 11/1994 | Antos et al. | 385/123 |
| 5,532,868 | 7/1996 | Gnauck et al. | 359/332 |
| 5,602,666 | 2/1997 | Ishikawa et al. | 359/161 |
| 5,856,881 | 1/1999 | Otsuka et al. | 359/173 |
| 5,861,970 | 1/1999 | Tatham et al. | 359/161 |
| 5,862,287 | 1/1999 | Stock et al. | 385/123 |

*Primary Examiner*—Hung N. Ngo

[57] ABSTRACT

An optimized optical transmitter for use with a 1.3 $\mu$m directly-modulated DFB laser. A negative fiber dispersion is intentionally introduced into the system by selecting the operating wavelength to be less than the nominal zero-dispersion value. The introduction of the negative fiber dispersion reduces the system power penalty and results in an optical transmission system useful over relatively short lengths of standard single mode fiber (50 km, for example) without the need for additional amplification.

4 Claims, 2 Drawing Sheets

OPTICAL WAVELENGTH OPTIMIZATION FOR HIGH SPEED WDM TRANSMISSION SYSTEM

BACKGROUND OF THE INVENTION

1. Field of the Invention

The present invention relates to an optical transmission system and, more particularly, to a system that achieves optimization of the optical transmission wavelength by incorporating the effects of negative fiber dispersion into the wavelength selection criteria.

2. Description of the Prior Art

With the recent advances in high-speed electronics, 10 Gb/s transmission is becoming an attractive technology for increasing optical transmission system capacity. When using a 1.55-$\mu$m wavelength chirp-free transmitter, the transmission distance at 10 Gb/s is limited to about 60 km of standard single-mode fiber (SMF), as a result of fiber chromatic dispersion. When using a transmitter wavelength of 1.3 $\mu$m, fiber chromatic dispersion has been considered as non-critical and system loss is instead attributed to factors such as optical fiber loss and receiver/regenerator sensitivity (although these limitations may be overcome by using amplifiers in the system).

However, as data rates continue to increase, it has become apparent that fiber chromatic dispersion at 1.3 $\mu$m will become problematic, requiring ever-increasing amounts of transmitter power, even for short-haul (e.g., 50 km or less) applications.

SUMMARY OF THE INVENTION

The present invention relates to an optical transmission system that intentionally introduces negative fiber dispersion by using a transmitting wavelength less than the conventional zero-dispersion value. The introduction of the negative fiber dispersion reduces the system power penalty and results in an optical transmission system useful over relatively short lengths of fiber (50 km, for example) without the need for additional amplification.

In accordance with the teachings of the present invention, by selecting a system transmission wavelength $\lambda_{sys}$ from within a range $\Delta\lambda_{sys}$ less than the fiber zero-dispersion wavelength $\lambda_0$, the overall system power budget may be increased. The wavelength range $\Delta\lambda_{sys}$ associated with negative fiber dispersion has been found to have both an upper bound and a lower bound. The upper bound is defined by the quantity $\lambda_0 - \Delta\lambda$, where $\Delta\lambda$ is the known variation with respect to the nominal wavelength $\lambda_0$. The lower bound is defined as the wavelength at which the dispersion power penalty value crosses between the negative and positive regimes. This lower bound can be determined knowing the fiber dispersion slope, the length of the transmission fiber, as well as the actual dispersion value at which the crossover occurs. In one embodiment using a DFB laser, a 50 km length of single mode fiber ($\lambda_0$=1310 nm, $\Delta\lambda$=20 nm, dispersion slope S=0.1 ps/nm$^2$/km) and a crossover fiber dispersion value of −600 ps/nm, the system wavelength would have an upper bound of 1290 nm and a lower bound of 1210 nm, thus exhibiting a system wavelength range $\Delta\lambda_{sys}$ of 80 nm.

This operable wavelength range $\Delta\lambda_{sys}$ results in the ability to provide for multiple channels with an acceptable channel spacing. For example, assuming $\Delta\lambda_{sys}$=80 nm, a wavelength division multiplexed system of 100 channels, separated by 0.8 nm may be formed.

By operating a system within the optimized wavelength range as determined in accordance with the present invention, system power is saved and improved performance will result. With a +7-dBm average laser module power and −16-dBm receiver sensitivity, the "power budget" for the overall system is 23 dB, which allows for transmission over 50 km of standard SMF without optical amplifiers.

BRIEF DESCRIPTION OF THE DRAWINGS

Referring now to the drawings.

DETAILED DESCRIPTION

Figure 1:
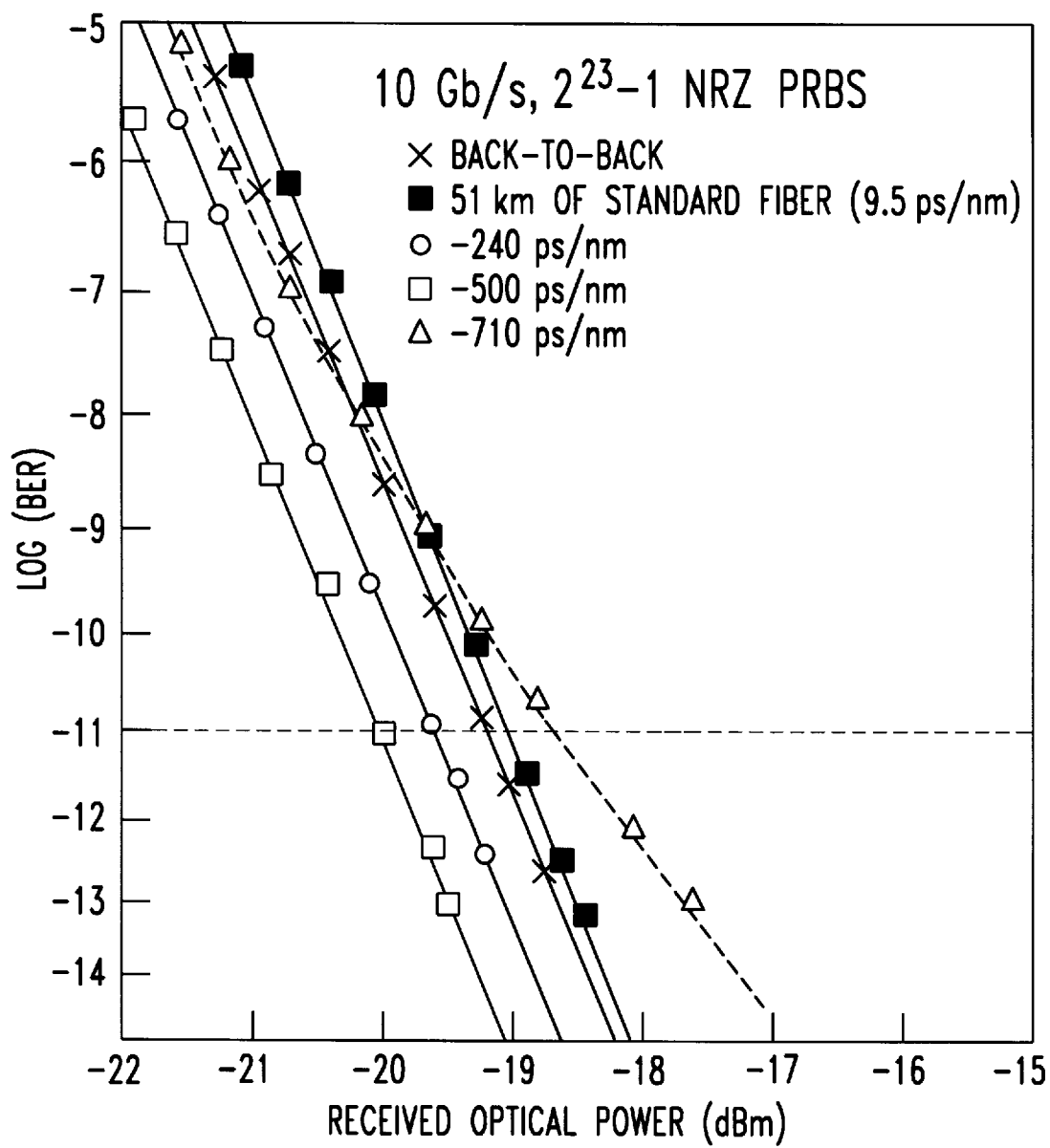
FIG. 1 contains a graph of the measured bit error rate (BER) of $2^{23}-1$ nonreturn-to-zero (NRZ) data at 10 Gb/s, as a function of received optical power; the measurements were performed on a "back to back" transmitter/receiver arrangement and a number of arrangements using standard single mode fiber and different lengths of dispersion-shifted fiber.

While fiber chromatic dispersion can be considered non-critical at 1.3-$\mu$m wavelength, with significant increases in data rates (i.e., greater than 10 Gb/s), its impact may significantly limit system performance. Thus, for example, to keep a dispersion penalty below a certain value (for example, 1 dB), the operating laser wavelength range needs to be limited. The impact of fiber dispersion at a 10 Gb/s data rate is illustrated in FIG. 1, which contains a graph of bit error rate (BER) over a wide range of dispersion values. The measurements at the various dispersion values were made by using standard single mode fiber (SMF) and different lengths of dispersion-shifted fiber (DSF). A first series of measurements, indicated by the "x" in FIG. 1, were made on a "back to back" transmitter/receiver arrangement. No dispersion is therefore associated with this series of measurements and the BER was found to vary from less than $10^{-6}$ at a received power of approximately −21-dBm to about $10^{-13}$ BER at a received power level of approximately −19-dBm. When a standard single mode fiber of 51 km length (the nominal length associated with short-haul communication applications) was inserted between the transmitter and receiver, a slight increase in the received power was noticed. The measured dispersion penalty at $10^{-11}$ BER (the usual system value) is approximately 0.15 dB.

Since the impact of fiber chromatic dispersion is known to increase for increasing data rates, the effect of increasing data rate on received power may be studied by intentionally varying the fiber dispersion within the transmission system. Referring to FIG. 1, a number of additional measurements of BER were made on systems using different lengths of dispersion shifted fiber. In particular, a first length of fiber having a dispersion value of −240 ps/nm yielded the BER measurements as indicated by the circles in FIG. 1. These measurements remain essentially below those of the conventional arrangement by a constant value of approximately 0.5 dBm. Therefore, using a negative fiber dispersion of this value will result in adding this amount of power to the overall system power budget. For the next series of measurements, the fiber dispersion was decreased again, this time to a value of approximately −500 ps/nm. Referring to the BER measurements for this system (indicated by the outlined open squares in FIG. 1), an additional 0.5 dBm improvement in system power budget was observed. The last experimental arrangement utilized a fiber dispersion value of −710 ps/nm. As shown in FIG. 1, this value, especially at higher BER values, degraded the system performance with respect to a conventional (non-dispersion shifted fiber) arrangement. These results may be explained by pulse shaping effects. As the amount of negative fiber dispersion begins to increase, pulses become compressed (thus a negative dispersion penalty). After a certain negative fiber dispersion limit is reached, however, the pulses will begin to broaden (as shown for the −710 ps/nm plot).

Figure 2:
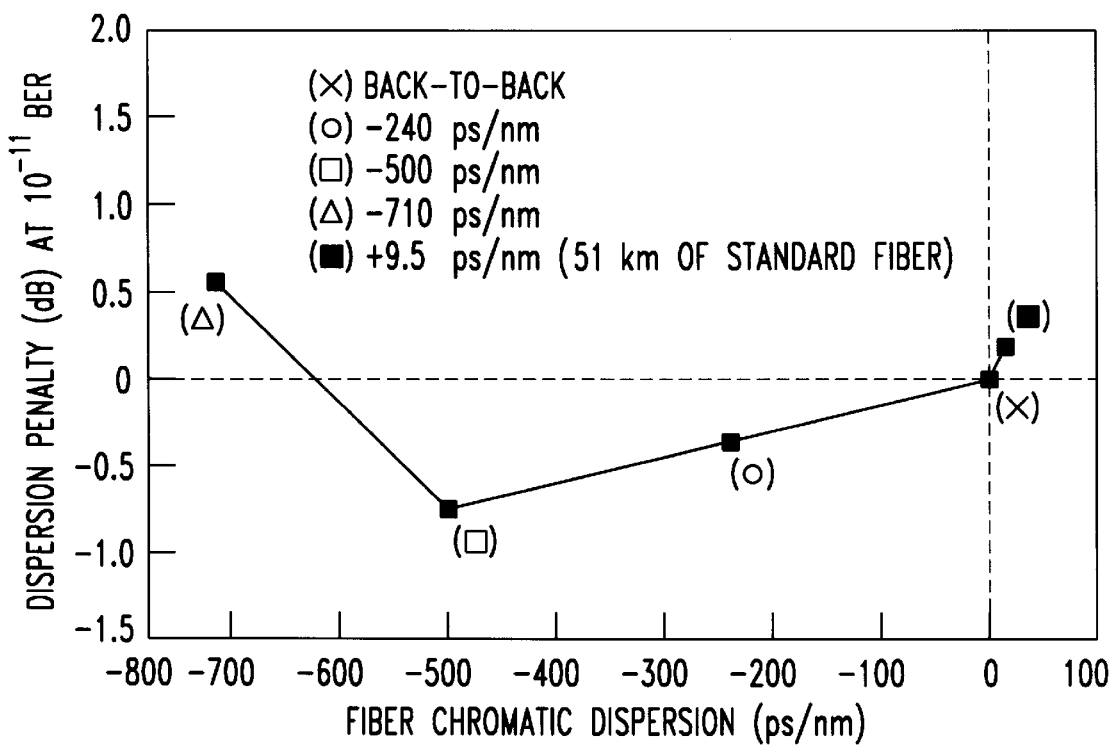
FIG. 2 is a graph of dispersion power penalty at a BER of $10^{-11}$ for the different fiber dispersions as used in FIG. 1.

FIG. 2 illustrates the various measured dispersion power penalties associated with a BER of $10^{-11}$, as indicated by the dashed line in FIG. 1. The plot of FIG. 2 clearly shows the range of fiber chromatic dispersion values that yield a negative dispersion-related power penalty. In particular, when operating a 10 Gb/s transmission system using a 1.3 $\mu$m low-chirp directly-modulated DFB laser, the associated fiber dispersion values that result in a negative power penalty are approximately −600 to 0 ps/nm. Therefore, in order to increase the overall system power budget, the illustrated wide range of negative fiber dispersion may be used. That is, by selecting a system wavelength $\lambda_{sys}$ within the system range $\Delta\lambda_{sys}$ associated with the negative fiber dispersion range of −600 ps/nm to 0 ps/nm, a negative dispersion-related power penalty will result. It is to be understood that at a different transmission rate, or with a different laser source, the actual range may vary. However, in any such system there will be an associated negative fiber dispersion range that will yield a negative power penalty. Therefore, in accordance with the teachings of the present invention, by operating a transmission system within this negative dispersion region, the overall system power budget will be improved.

Figure 3:
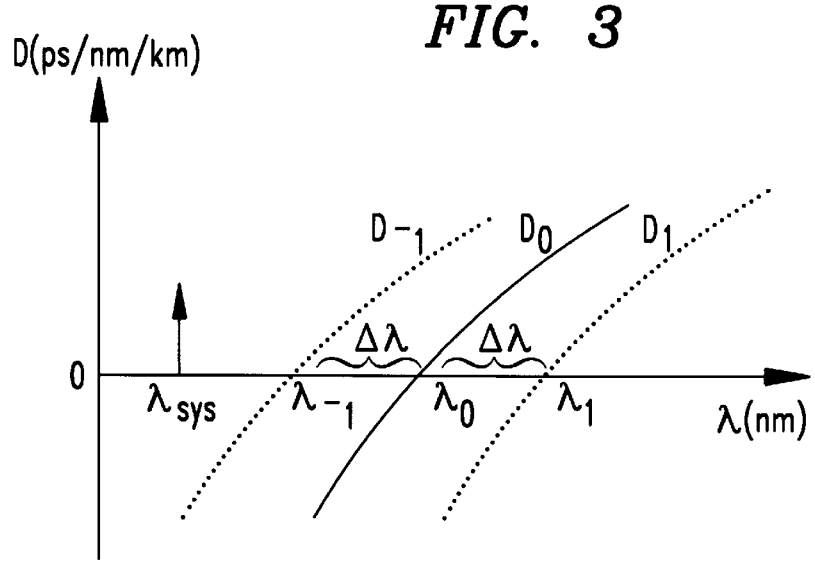
FIG. 3 is a graph illustrating the system wavelength range developed in accordance with the present invention to maintain a negative dispersion penalty.

FIG. 3 illustrates the embedded standard single mode fiber dispersion characteristics associated with the zero-dispersion wavelength distribution of $\Delta\lambda$ centered at the nominal value of $\lambda_0$. For the fiber dispersion range of −600 to 0 ps/nm illustrated in FIG. 2, a system operating wavelength $\lambda_{sys}$ is evaluated. In order to operate in the negative dispersion region, the following requirements are imposed. First, the system wavelength $\lambda_{sys}$ must be less than the most negative nominal value, $\lambda_0-\Delta\lambda$, denoted as $\lambda_{-1}$. Presuming $\lambda_0=1310$ nm and $\Delta\lambda=20$ nm, $\lambda_{sys}$ must be less than 1290 nm. Second, $\lambda_{sys}$ must be greater than the wavelength associated with the cross-over from negative to positive dispersion power penalty, as shown in FIG. 2. This value can be calculated by knowing the dispersion slope, S, of the system fiber, as well as the length L of the fiber used. Particularly, by knowing the lower extreme of the negative dispersion range (−600 ps/nm in this example), the crossover can be determined using the following relation:

$$(\lambda_{sys}-\lambda_1)*S*L>-600 \text{ ps/nm}.$$

In an exemplary embodiment utilizing a directly-modulated DFB laser, the dispersion slope S is approximately 0.1 ps/nm²/km, and the fiber length L is approximately 50 km.

Using these values in the above relation, the following solution is presented:

$$-80 \text{ nm}<(\lambda_{sys}-\lambda_{-1}).$$

Combining the upper and lower bounds into a single expression yields the following wavelength range $\Delta\lambda_{sys}$ associated with the optimized power penalty reduction:

$$-80\text{nm}<(\lambda_{sys}-\lambda_{-1})<0\text{nm}.$$

Therefore, for a typical $\lambda_0=1310$ nm, a system wavelength $\lambda_{sys}$ in the range of 1210 nm to 1290 nm would be appropriate.

For a known wavelength range, a wavelength-division-multiplexing (WDM) system can be implemented to supply a large number of separate channels, each with the negative dispersion power penalty characteristic. If the spacing, s, between channels is known, the number of channels, N, in the WDM system will be $\Delta\lambda_{sys}/S$. Alternatively, if N is known, the channel spacing will be determined by $\Delta\lambda_{sys}/N$. For example, if $\Delta\lambda_{sys}=80$ nm and s=0.8 nm for a 10 Gb/s bit-rate of each channel, then the number of channels will be 100, resulting in an aggregate transmission capacity of 1 Tb/s.

What is claimed is:

1. An optical transmission system including a laser transmitting device and a single mode transmission fiber, said fiber having a nominal zero-dispersion wavelength range of $\lambda_0\pm\Delta\lambda$, $\lambda_0$ being defined as the fiber zero dispersion wavelength and $\Delta\lambda$ being defined as a predetermined, known variation of said fiber zero dispersion wavelength, wherein a system wavelength $\lambda_{sys}$ exhibits a negative dispersion-related power penalty and is selected from within a system wavelength range of $\Delta\lambda_{sys}$ having an upper bound of $\lambda_0-\Delta\lambda$ and a lower bound defined by the relation:

lower bound=$M(S*L)+(\lambda_0+\Delta\lambda)$, where M is defined as the maximum fiber negative dispersion value for which the dispersion power penalty is negative, S is defined as the dispersion slope of the single mode transmission fiber and L is defined as the transmission length of said single mode transmission fiber.

2. An optical transmission system as defined in claim 1 wherein the transmission length of the single mode fiber is less than or equal to 50 km, having a nominal zero-dispersion wavelength of approximately 1310 nm and an associated $\Delta\lambda$ of 20 nm.

3. An optical transmission system as defined in claim 2 wherein the maximum value of the negative fiber dispersion is approximately −600 ps/nm and the dispersion slope is approximately 0.1 ps/nm²/km, resulting in a system wavelength range of approximately 1210–1290 nm.

4. An optical transmission system as defined in claim 1 wherein the laser transmitting device comprises a directly-modulated distributed feedback laser.

* * * * *